United States Patent
Guo

(10) Patent No.: US 9,723,492 B2
(45) Date of Patent: *Aug. 1, 2017

(54) APPARATUS AND METHOD FOR ANTENNA MANAGEMENT

(71) Applicant: Sony Corporation, Tokyo (JP)

(72) Inventor: Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/237,229

(22) Filed: Aug. 15, 2016

(65) Prior Publication Data

US 2016/0360421 A1     Dec. 8, 2016

Related U.S. Application Data

(63) Continuation of application No. 14/718,794, filed on May 21, 2015, now Pat. No. 9,419,758, which is a
(Continued)

(30) Foreign Application Priority Data

Feb. 22, 2011   (CN) .......................... 2011 1 0045560

(51) Int. Cl.
*H04W 16/14*     (2009.01)
*H04W 16/10*     (2009.01)
(Continued)

(52) U.S. Cl.
CPC ........... *H04W 16/14* (2013.01); *H04L 5/0037* (2013.01); *H04W 16/10* (2013.01); *H04W 74/04* (2013.01)

(58) Field of Classification Search
CPC ..... H04W 16/14; H04W 74/04; H04W 16/10; H04L 5/0037
See application file for complete search history.

(56) References Cited

U.S. PATENT DOCUMENTS

| 7,227,855 B1* | 6/2007 | Barratt | H04W 72/06 370/343 |
| 8,792,373 B2 | 7/2014 | Ko et al. | |

(Continued)

FOREIGN PATENT DOCUMENTS

| CN | 101400135 | 4/2009 |
| CN | 101800518 | 8/2010 |

(Continued)

OTHER PUBLICATIONS

Japanese Office Action issued Feb. 10, 2015 in Japanese Patent Application No. 2013-553770 (with English Summary of Reasons for Refusal).

(Continued)

*Primary Examiner* — Duc C Ho
(74) *Attorney, Agent, or Firm* — Oblon, McClelland, Maier & Neustadt, L.L.P.

(57) ABSTRACT

A method and an apparatus for antenna management are disclosed. The method comprises that resource use status data are collected from managed access networks, access networks which participate in antenna scheduling are selected from the managed access networks according to the resource use status data to compose an antenna scheduling set, wherein access networks using same spectrum resources are composed in the same antenna scheduling set; radio links of each access network in the antenna scheduling set are divided into one or more radio link clusters; radio resources are allocated to every radio link cluster in the antenna scheduling set in order that mutual interferences among all the radio link clusters in the antenna scheduling set are within a preset range; and radio resource allocation results are sent to the access network that the radio link clusters belong to.

13 Claims, 10 Drawing Sheets

Related U.S. Application Data continuation of application No. 13/982,318, filed as application No. PCT/CN2012/070409 on Jan. 16, 2012, now Pat. No. 9,042,305.

(51) Int. Cl.
*H04L 5/00* (2006.01)
*H04W 74/04* (2009.01)

(56) References Cited

U.S. PATENT DOCUMENTS

| | | | |
|---|---|---|---|
| 9,042,305 B2 | 5/2015 | Guo | |
| 2008/0120264 A1* | 5/2008 | Lee | H04L 41/0893 706/47 |
| 2009/0196245 A1* | 8/2009 | Ji | H04L 1/0025 370/329 |
| 2010/0029282 A1 | 2/2010 | Stamoulis et al. | |
| 2010/0131644 A1 | 5/2010 | Jeong et al. | |
| 2011/0044193 A1 | 2/2011 | Forenza et al. | |
| 2011/0286401 A1* | 11/2011 | Wijting | H04W 16/14 370/329 |
| 2012/0014332 A1* | 1/2012 | Smith | H04W 16/14 370/329 |
| 2012/0046038 A1 | 2/2012 | Gao et al. | |
| 2012/0202558 A1 | 8/2012 | Hedberg et al. | |
| 2013/0235837 A1 | 9/2013 | Suo et al. | |

FOREIGN PATENT DOCUMENTS

| | | |
|---|---|---|
| EP | 1 855 492 A1 | 11/2007 |
| JP | 2007-525926 | 9/2007 |
| JP | 2007-306572 | 11/2007 |
| JP | 2009-177814 | 8/2009 |
| WO | WO 2005/086381 A1 | 9/2005 |
| WO | 2010 014961 | 2/2010 |
| WO | WO 2010/019613 A1 | 2/2010 |

OTHER PUBLICATIONS

Japanese Office Action issued Oct. 6, 2015 in Japanese Patent Application No. 2013-553770 (with English Summary of Reasons for Refusal).

International Search Report Issued Apr. 19, 2012 in PCT/CN12/070409 Filed Jan. 16, 2012.

* cited by examiner

APPARATUS AND METHOD FOR ANTENNA MANAGEMENT

CROSS-REFERENCE TO RELATED APPLICATIONS

This application is a continuation of U.S. application Ser. No. 14/718,794, filed May 21, 2015, which is a continuation of U.S. application Ser. No. 13/982,318, filed Jul. 29, 2013, now U.S. Pat. No. 9,042,305, issued May 26, 2015, which is a 371 National Stage of PCT/CN2012/070409, filed Jan. 16, 2012, and is based upon and claims the benefit of priority from prior Chinese Patent Application No. 2011 10 045 560.5, filed Feb. 22, 2011, the entire content of each of the foregoing applications is incorporated herein by reference.

FIELD OF THE INVENTION

The present invention relates to the field of wireless communications and in particular to an apparatus and a method for antenna management.

BACKGROUND OF THE INVENTION

Global information networks are evolving rapidly toward Internet Protocol (IP)-based Next Generation Networks (NGNs) along with the dramatic development of computer and communication technologies. Another important feature of the next generation networks lies in coexistence of a plurality of radio technologies to form heterogeneous radio access networks.

FIG. 1 illustrates a schematic diagram of heterogeneous radio access networks in the prior art. As illustrated in FIG. 1, there are a variety of heterogeneous radio access networks which can be divided into a Wide Area Network (WAN), a Metropolitan Area Network (MAN), a Local Area Network (LAN) and a Personal Area Network (PAN) in terms of their coverage ranges, a point-to-multipoint single-hop network, a multi-hop network, a mesh network and an ad-hoc network in terms of their network architectures, etc. All or a part of these radio access network access an IP-based core network in a wired or wireless manner to obtain service for a user. Thus, the access networks can be connected to a heterogeneous access network manager by which the access networks are managed.

The heterogeneous radio access networks are significant from the respective perspectives of a radio technology, a coverage range, a network architecture, network performance, etc., and they form three-dimensional coverage in terms of geographical distribution and cooperate to provide a user with ubiquitous radio multimedia services with various contents. Radio spectrum resources available to these access networks are relatively rare.

In the next generation networks, the radio access networks interconnected over the IP-based core network can exchange information to offer an opportunity for an improved utilization rate of resources on one hand. On the other hand, the heterogeneous radio access networks form three-dimensional coverage with resource contention and interference to make it difficult to utilize the resources effectively. It is thus desirable to design an effective antenna management apparatus and method for efficient utilization of the resources of the next generation networks.

SUMMARY OF THE INVENTION

A brief summary of the invention is given below to provide basic understanding on some aspects of the invention. It is noted that the summary is not an exhaustive description of the invention. It is not intended to define a key or important part of the invention, nor is it intended to define the scope of the invention. It only aims to give some concepts in a simplified form as a preface to the detailed description that follows.

The invention is intended to address at least the foregoing technical problem in the prior art to improve a chance of multiplexing spectrum resources in order for efficient utilization of resources of next generation networks.

According to an aspect of the invention, there is provided an antenna management method including: collecting resource use information from managed access networks; selecting the access networks joining antenna scheduling from the managed access networks according to the resource use information to form an antenna scheduling set, wherein the access networks using the same spectrum resource form the same antenna scheduling set; grouping wireless links of each access network in the antenna scheduling set into one or more wireless link clusters, wherein each wireless link cluster includes one or more wireless links of the same access network which have the same transmitting node or the same receiving node; allocating wireless resources to all the wireless link clusters of the antenna scheduling set such that interference between all the wireless link clusters of the antenna scheduling set is within a predetermined range; and sending a wireless resource allocation result to the access network in which each wireless link cluster is located.

According to another aspect of the invention, there is provided an antenna management apparatus including: a resource use information collector configured to collect resource use information from managed access networks; and an antenna scheduler including: an antenna selector configured to select the access networks joining antenna scheduling from the managed access networks according to the resource use information to form an antenna scheduling set, wherein the access networks using the same spectrum resource form the same antenna scheduling set; a link cluster determiner configured to group wireless links of each access network in the antenna scheduling set into one or more wireless link clusters, wherein each wireless link cluster includes one or more wireless links of the same access network which have the same transmitting node or the same receiving node; and a resource scheduler configured to allocate wireless resources to all the wireless link clusters of the antenna scheduling set such that interference between all the wireless link clusters of the antenna scheduling set is within a predetermined range, and to send a wireless resource allocation result to the access network in which each wireless link cluster is located.

In the method and apparatus according to the above aspects of the invention, access networks joining antenna scheduling among managed access networks are grouped into different antenna scheduling sets, where access networks using the same spectrum resource form the same antenna scheduling set; wireless links in each access network are grouped into one or more wireless link clusters; and wireless resources are allocated to all the wireless link clusters in the antenna scheduling set so that interference between all the wireless link clusters of the antenna scheduling set is within a predetermined range Thus, access networks as many as possible can operate concurrently over the same spectrum resource within a tolerant interference range to thereby improve a chance of spectrum multiplexing in order for efficient utilization of the resources. Furthermore, as compared with the case that a resource is allocated per wireless link, a wireless resource is allocated per wireless link cluster to thereby lower the amount of calculation required for antenna scheduling.

Furthermore, another aspect of the invention further provides a computer program product on which computer readable instruction codes are stored, the instruction codes upon being read and executed by a computer causing the computer to perform an antenna management process, the antenna management process including: collecting resource use information from managed access networks; selecting the access networks joining antenna scheduling from the managed access networks according to the resource use information to form an antenna scheduling set, wherein the access networks using the same spectrum resource form the same antenna scheduling set; grouping wireless links of each access network in the antenna scheduling set into one or more wireless link clusters, wherein each wireless link cluster includes one or more wireless links of the same access network which have the same transmitting node or the same receiving node; allocating wireless resources to all the wireless link clusters of the antenna scheduling set such that interference between all the wireless link clusters of the antenna scheduling set is within a predetermined range; and sending a wireless resource allocation result to the access network in which each wireless link cluster is located.

Furthermore, another aspect of the invention further provides a storage medium carrying a program product on which computer readable instruction codes are stored, the instruction codes upon being read and executed by a computer causing the computer to perform an antenna management process, the antenna management process including: collecting resource use information from managed access networks; selecting the access networks joining antenna scheduling from the managed access networks according to the resource use information to form an antenna scheduling set, wherein the access networks using the same spectrum resource form the same antenna scheduling set; grouping wireless links of each access network in the antenna scheduling set into one or more wireless link clusters, wherein each wireless link cluster includes one or more wireless links of the same access network which have the same transmitting node or the same receiving node; allocating wireless resources to all the wireless link clusters of the antenna scheduling set such that interference between all the wireless link clusters of the antenna scheduling set is within a predetermined range; and sending a wireless resource allocation result to the access network in which each wireless link cluster is located.

These and other advantages of the invention will become more apparent from the following detailed description of preferred embodiments of the invention with reference to the drawings.

BRIEF DESCRIPTION OF THE DRAWINGS

The foregoing and other objects, features and advantages of the invention will become easier to understand from the following description of embodiments of the invention with reference to the drawings. Components in the drawings are merely intended to illustrate the principle of the invention. In the drawings, identical or similar technical features or components will be denoted with identical or similar reference numerals.

DETAILED DESCRIPTION OF THE INVENTION

Figure 1:
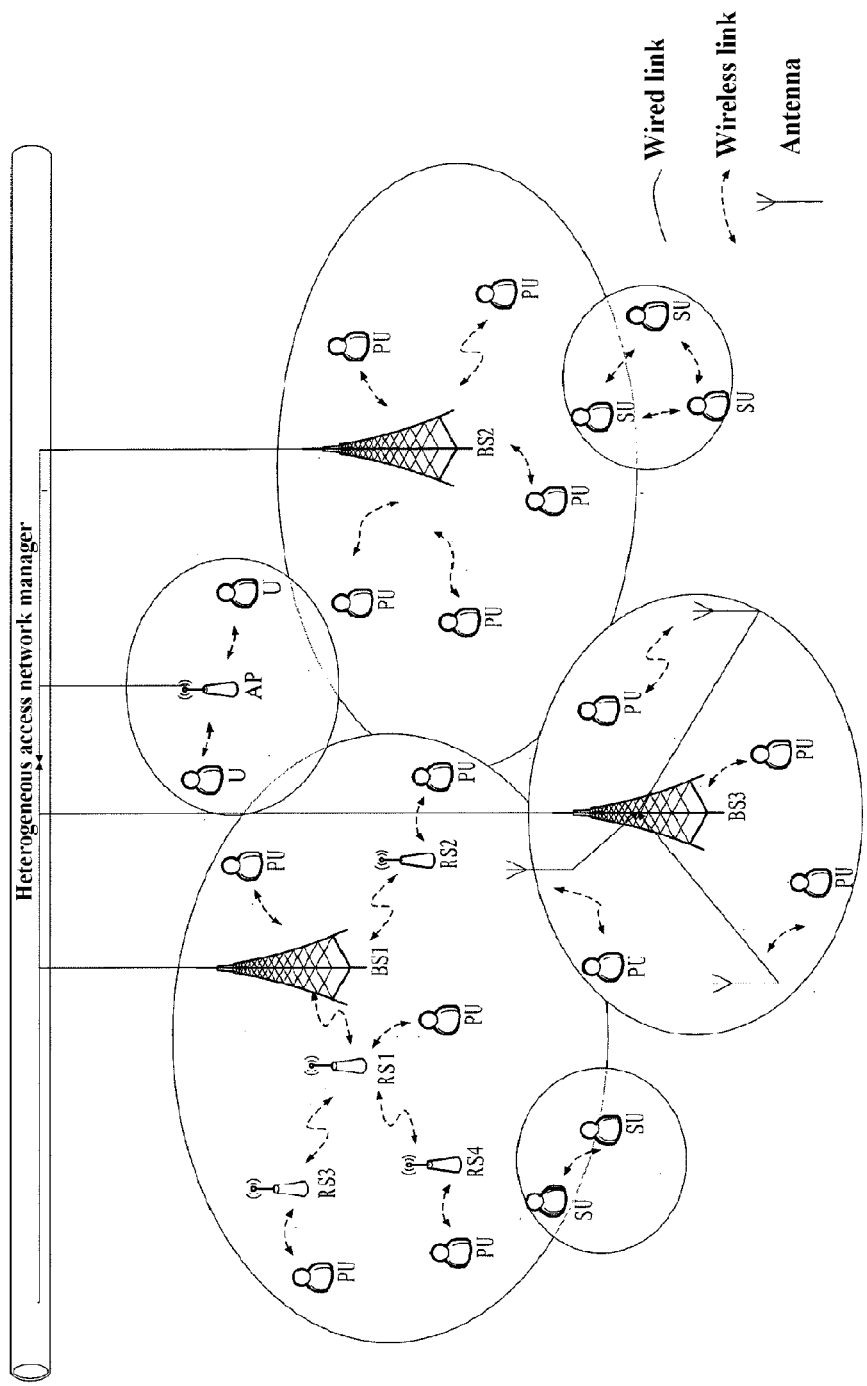
FIG. 1 illustrates a schematic diagram of heterogeneous radio access networks in the prior art.

Embodiments of the invention will be described below with reference to the drawings. An element and a feature described in one drawing or one implementation of the invention can be combined with an element and a feature illustrated in one or more other drawings or implementations. It shall be noted that a representation and a description of components and processes irrelevant to the invention and known to those ordinarily in the art have been omitted in the drawings and the description for the sake of clarity.

Figure 2:
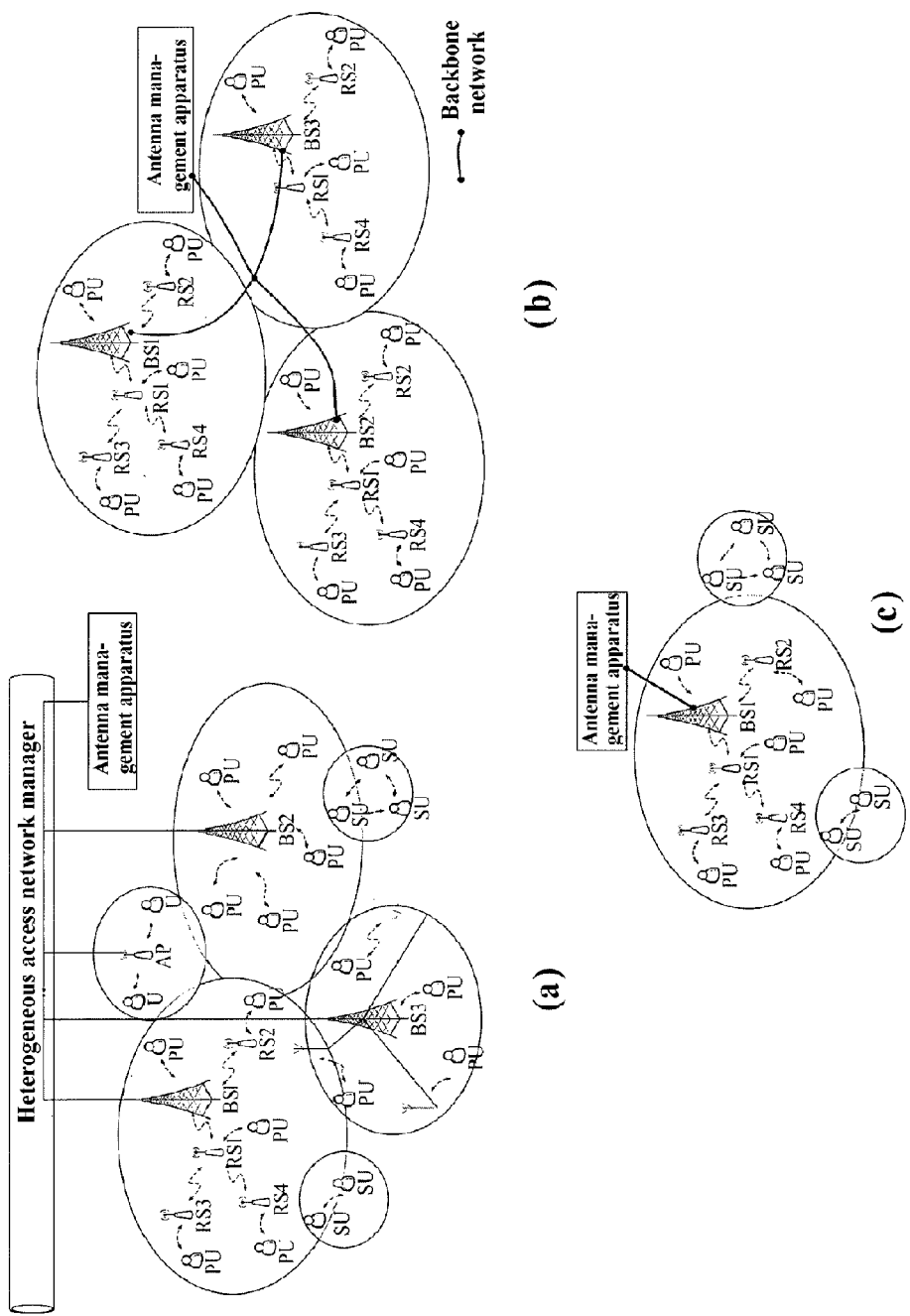
FIG. 2 illustrates a schematic diagram of a relationship between an antenna management apparatus according to embodiments of the invention and radio access network.

The location of an antenna management apparatus according to an embodiment of the invention can be set flexibly. FIG. 2 illustrates a schematic diagram of a relationship between the antenna management apparatus according to the embodiments of the invention and radio access network. For example, as illustrated in the (a) part of FIG. 2, the antenna management apparatus according to the embodiment of the invention can reside in a heterogeneous access network manager to perform antenna management on heterogeneous radio access networks in a service range of the heterogeneous access network manager. As illustrated in the (b) part of FIG. 2, the antenna management apparatus can reside in a backbone network of a specific access network to perform antenna management on several proximate cells in the access network. As illustrated in the (c) part of FIG. 2, the antenna management apparatus can alternatively reside in a base station BS1 of a specific access network to perform antenna management on the access network itself and heterogeneous access networks consisted of other proximate access networks.

Figure 3:
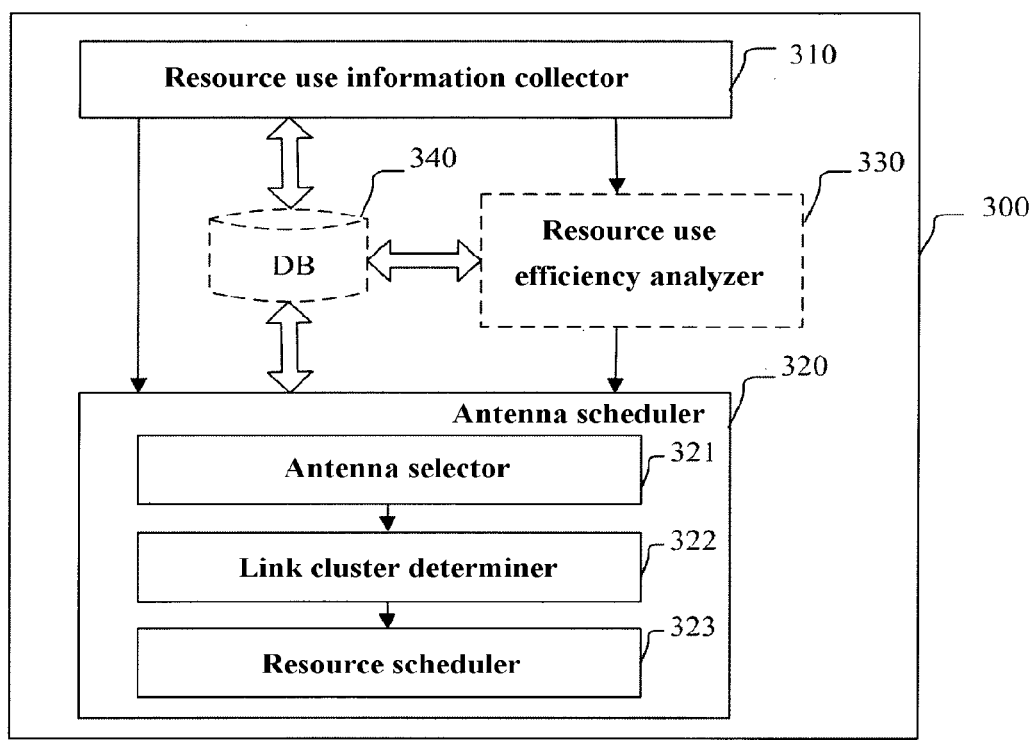
FIG. 3 illustrates a schematic block diagram of an antenna management apparatus according to one embodiment of the invention.

FIG. 3 illustrates a schematic block diagram of an antenna management apparatus according to one embodiment of the invention, where the antenna management apparatus 300 includes: a resource use information collector 310 configured to collect resource use state data from managed access networks; and an antenna scheduler 320 configured to perform antenna scheduling on the access networks according to the resource use state data collected by the resource use information collector 310 and to transmit an antenna scheduling result to the access networks.

Optionally, the antenna management apparatus 300 can further include a resource use efficiency analyzer 330, represented by a dotted box in FIG. 3, configured to analyze the resource use state data, to locate access networks with a low resource utilization rate and to initiate antenna scheduling. Furthermore, optionally, the antenna management apparatus 300 can further include a storage device configured to store the collected resource use state data of the radio access networks. For example, the storage device is a resource use state database (illustrated as DB in FIG. 3) 340 represented by a dotted box in FIG. 3. It can be appreciated that the resource use state data can alternatively be stored in a storage device in another form.

It shall be appreciated that the respective components represented by the dotted boxes relate to only preferred or alternative implementations but may not necessarily be included in the antenna management apparatus 300. Furthermore, it shall be appreciated that the antenna management apparatus 300 can further include any combination of the respective components represented by the dotted boxes in addition to the resource use information collector 310 and the antenna scheduler 320.

An operation flow of the antenna management apparatus according to the embodiment of the invention will be described below with reference to FIG. 4 to FIG. 13.

Figure 4:
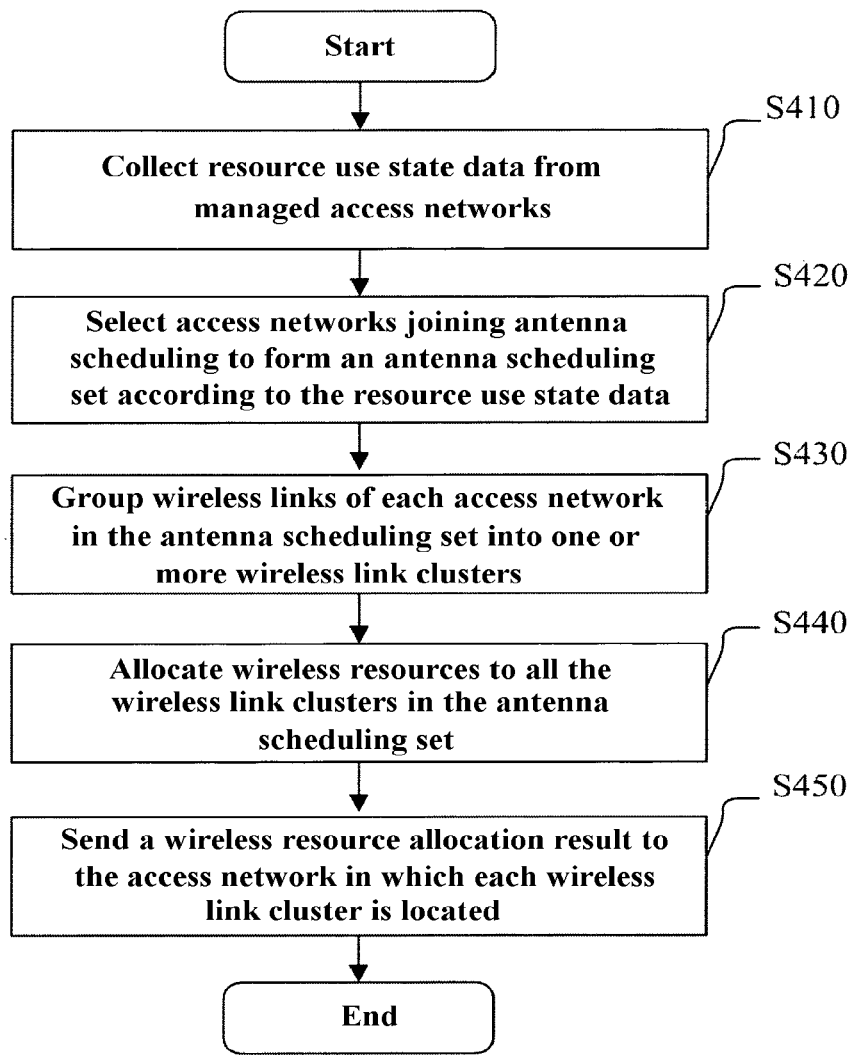
FIG. 4 illustrates a flow chart of an antenna management method performed by the antenna management apparatus according to the embodiment.

FIG. 4 illustrates a flow chart of an antenna management method performed by the antenna management apparatus according to this embodiment. In the step S410, the resource use information collector 310 of the antenna management apparatus collects resource use state data from managed access networks. Those skilled in the art can appreciate that the resource use state data collected by the resource use information collector 310 include, for example, available wireless resources, adopted radio technologies, time or space-dependent variations of resource utilization rates, etc., of the respective access networks.

Furthermore, the resource use information collector 310 can further collect an antenna scheduling request from the managed access networks as will be described below. In this context, both the resource use state data and the antenna scheduling request can be referred to resource use information.

In the step S420, an antenna selector 321 in the antenna scheduler 320 selects the access networks joining antenna scheduling from the managed access networks according to the resource use state data to form an antenna scheduling set, where the access networks using the same spectrum resource form the same antenna scheduling set.

In the step S430, a link cluster determiner 322 in the antenna scheduler 320 groups wireless links of each access network in the antenna scheduling set into one or more wireless link clusters. Here, each wireless link cluster includes one or more wireless links of the same access network which have the same transmitting node or the same receiving node, for example.

Then in the step S440, a resource scheduler 323 in the antenna scheduler 320 allocates wireless resources to all the wireless link clusters of the antenna scheduling set such that interference between the wireless link clusters is within a predetermined range. Here, the wireless resource may be resources in the time domain, resources in the frequency domain, resources in the code domain or any combination thereof.

The antenna scheduler 320 performs antenna scheduling by selecting the access networks joining antenna scheduling to form an antenna scheduling set and grouping wireless links of each access network into a wireless link cluster and allocating wireless resources to all the wireless link clusters in the antenna scheduling set.

Thereafter in the step S450, the resource scheduler 323 in the antenna scheduler 320 sends a wireless resource allocation result to the access networks in which the wireless link clusters are located as the antenna scheduling result.

It shall be noted that the steps given here will not necessarily be performed in a defined order. For example, the step S430 of grouping into a wireless link cluster alternatively can be performed before the step S420 of forming an antenna scheduling set and wireless links can be grouped into a cluster for each managed access network.

Figure 5:
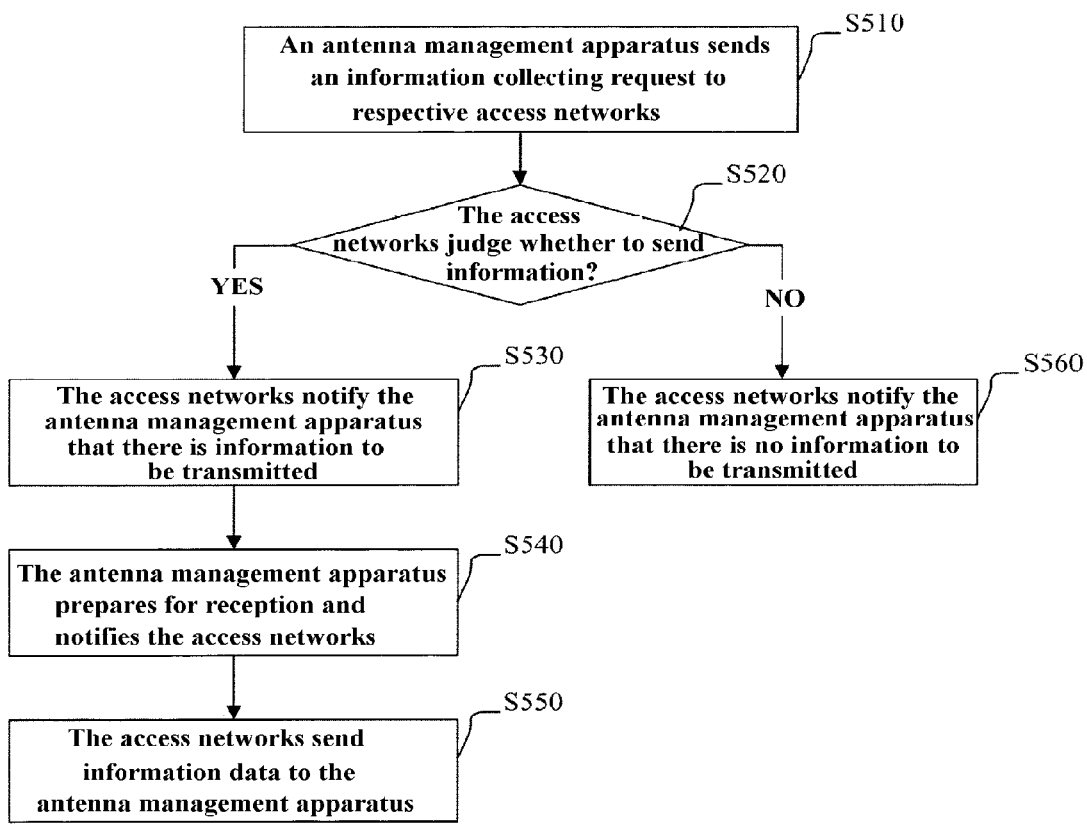
FIG. 5 illustrates a flow chart of collecting information by a resource use information collector according to one embodiment of the invention.
Figure 6:
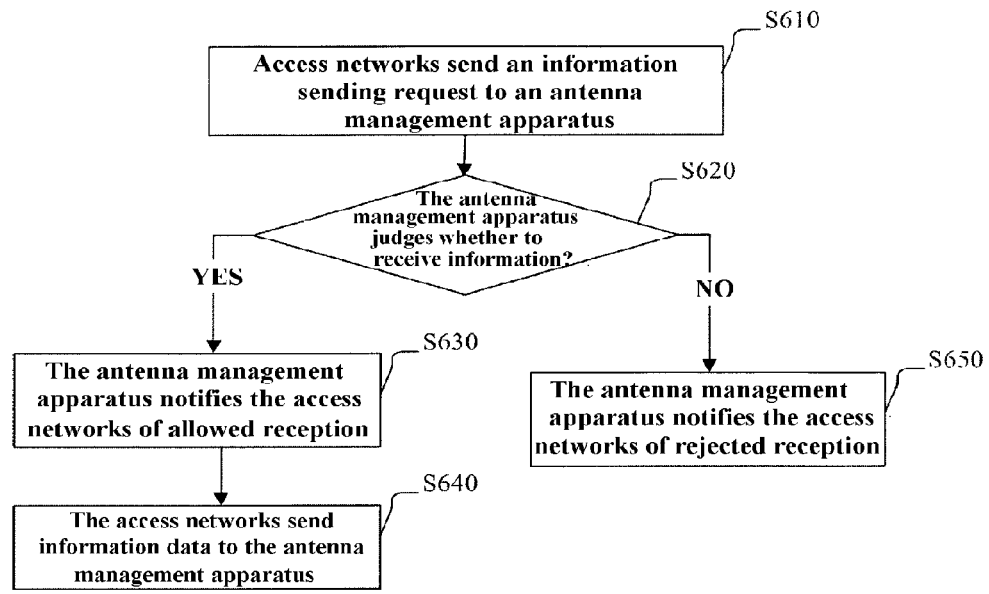
FIG. 6 illustrates a flow chart of collecting information by a resource use information collector according to another embodiment of the invention.

A process of collecting information by the resource use information collector 310 will be described below with reference to the flow charts illustrated in FIG. 5 and FIG. 6. The resource use information collector 310 can collect resource use information by sending an information collecting request to the managed access networks periodically or can collect resource use information by receiving information data transmitted from the managed access networks on their own initiatives. FIG. 5 and FIG. 6 illustrate examples of these two scenarios respectively.

In the example of FIG. 5, the resource use information collector 310 collects resource use information on its own initiative. Typically, this collection pattern is performed periodically.

In the step S510, the antenna management apparatus, particularly the resource use information collector 310, sends an information collecting request, e.g., an information collecting request instruction InfoCollect_request, to the respective access networks. This signaling can carry an identifier of target information to be collected as needed. Thus, the access networks can hereby transport the corresponding information to thereby reduce network traffic.

In the step S520, the respective access networks judge whether to send information according to whether they have updated information upon reception of the information collecting request.

If there is updated information, then in the step S530, the access networks set an information collecting response signaling InfoCollect_reply to true and send the signaling to the antenna management apparatus to notify the antenna management apparatus that the access networks have information to be transmitted. If there is no updated information, then in the step S560, the access networks set InfoCollect_reply to False and send the signaling to the antenna management apparatus to notify the antenna management apparatus that the access networks have no information to be transmitted.

The resource use information collector 310 makes judgment upon reception of the response signaling. If the response signaling InfoCollect_reply is True, then in the step S540, the resource use information collector 310 prepares for reception and sends an information reception signaling InfoReceive_ready to the access networks. If the response signaling InfoCollect_reply is False, then the resource use information collector 310 performs no operation.

The access networks send information data InfoData to the antenna management apparatus in the step S550 upon reception of InfoReceive_ready.

In the example of FIG. 6, the access networks initiate collection of resource use information. Typically, this collection pattern is performed upon dramatic change in performance of the access networks.

In the step S610, the access networks send an information sending request, e.g., information sending request signaling InfoSend_request, to the antenna management apparatus 300, particularly the resource use information collector 310.

In the step S620, the resource use information collector 310 judges whether to receive information according to a condition upon reception of the request.

If reception is accepted, then in the step S630, the resource use information collector 310 sets an information sending response signaling InfoSend_reply to True and sends the signaling to the access networks to notify the access networks that reception is allowed. If reception is rejected (for example, due to a current heavy network load), then in the step 650, the resource use information collector 310 sets the information sending response signaling InfoSend_reply to False and sends the signaling to the access networks to notify the access networks that reception is rejected.

The access networks send information data InfoData to the resource use information collector 310 upon reception of InfoSend_reply which is True. The access network perform no operation if they receive InfoSend_reply which is False.

According to one embodiment of the invention, the resource use information collector 310 classifies the information data upon reception of the information data. If the information data is an antenna scheduling request signaling AntennaSchedule_request, then the resource use information collector 310 forwards the signaling to the antenna scheduler 320 to initiate antenna scheduling. If the information data is resource use state data, then the resource use information collector 310 stores the data into a storage device, e.g., a resource use state database 340 and sends an information analyzing request signaling InfoAnalyze_request to the resource use efficiency analyzer 330 to initiate a resource use efficiency analysis.

In an embodiment of the invention, the resource use state database 340 is mainly used to store resource use state data of the access networks served by the antenna management apparatus 300. Contents of the database 340 can include information internal to the access networks and information between the access networks. The information internal to the access networks is generally obtained by collecting resource use state information. The information internal to the access network includes, for example, available spectrum resources and adopted radio technologies of the access networks, architectures of the access networks (e.g., an antenna feature and distribution thereof, a cell coverage range, a link relationship in a multi-hop network, etc.), statistical data of resource use conditions of the access networks, etc. Particularly, the statistical data of the resource use conditions of the access networks can include a time-dependent variation of power control, a time-dependent variation of the utilization rate of wireless resources, a location-dependent variation of a signal to noise ratio of a user, a time-dependent variation of the number of users and other statistical data. For example, the information between the access networks includes a relative location and distance between the access networks (particularly, a relative location and distance between antennas), statistical information of an interference condition between the access networks, etc. The information between the access networks can be obtained in numerous existing methods. For example, a GPS has been widely applied nowadays, and specific physical locations of the respective access networks can be positioned by a GPS to thereby calculate a relative location and distance between the access networks.

The resource use state database 340 can be provided by the resource use information collector 310 with data and updates to thereby provide the antenna scheduler 320 and the resource use efficiency analyzer 330 with data required for their operations.

Figure 7:
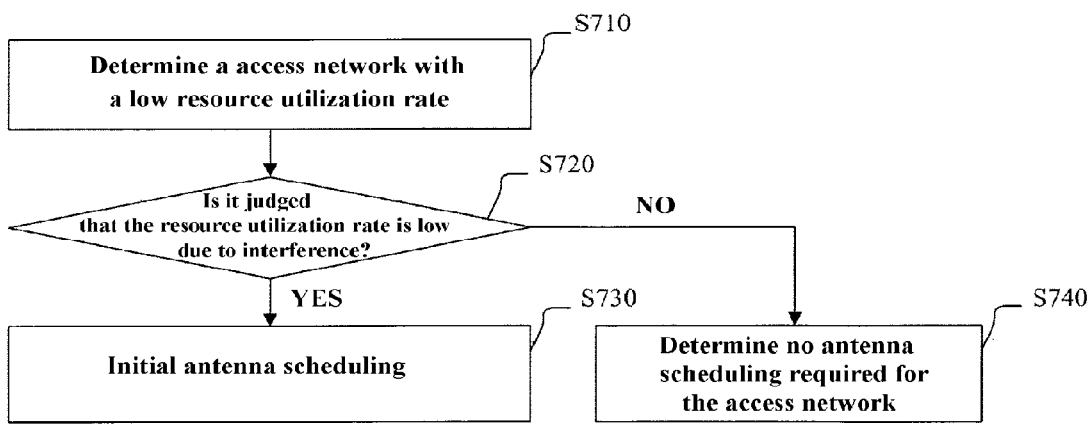
FIG. 7 illustrates a flow chart of initiating antenna scheduling by a resource use efficiency analyzer according to one embodiment of the invention.

Operations of the resource use efficiency analyzer 330 will be described below with reference to FIG. 7. FIG. 7 illustrates a flow chart of analyzing resource use efficiency and initiating antenna scheduling by the resource use efficiency analyzer according to one embodiment of the invention. In the step S710, the resource use efficiency analyzer 330 determines access networks with a low resource utilization rate by analyzing the resource use state data collected by the resource use information collector 310. For example, the resource use efficiency analyzer 330 can inquire the resource use state database 340 and selects access networks with a resource utilization rate below a predetermined threshold UtilizationRate$_{Th}$ as a set U of objects under examination. The resource utilization rate of an access network can be represented as the average of the ratio of the throughput of a system to the capacity of the system over a specific past period of time.

In the step S720, the resource use efficiency analyzer 330 judges whether the resource utilization rate is lower due to interference. The resource utilization rate may be lower due to numerous factors, for example, a smaller number of active users, a low total amount of required traffic bandwidth, interference from another access network, etc. Typically, antenna scheduling need to be performed only if the resource utilization rate is lower due to interference. By way of an example, the resource use efficiency analyzer 330 can judge whether the resource utilization rate is lower due to interference as follows: the analyzer examines the average signal to noise ratio SNR over a specific past period of time of each access network in the set U of access networks selected in the step S710. If the average signal to noise ratio is below a predetermined threshold SNR$_{Th}$, then it indicates that the access network is subject to relatively large interference, and it can be considered that the resource utilization rate thereof is lower due to interference. If the average signal to noise ratio is above the predetermined threshold SNR$_{th}$, then it indicates that the access network is subject to relatively small interference, it can be considered that the resource utilization rate thereof is lower due to another factor than interference, and the access network can be removed from the set U. Elements in the set U of access networks finally obtained in this method are access networks with a low resource utilization rate and strong interference for which antenna scheduling are required. Of course, whether the resource utilization rate thereof is lower due to interference can alternatively be judged by another existing method.

If it is judged in the step S720 that the resource utilization rate of the access network is lower due to interference, which indicates that antenna scheduling is required to be initiated, then the resource use efficiency analyzer 330 initiates antenna scheduling in the step S730. Stated otherwise, when the set U is not null, the resource use efficiency analyzer 330 initiates antenna scheduling. This can be performed by sending an antenna scheduling request signaling AntennaSchedule_request to the antenna scheduler 320. If it is judged in the step S720 that the resource utilization rate of the access network is lower due to another factor than interference, then the resource use efficiency analyzer 330 determines that no antenna scheduling is required for the access network in the step S740.

In addition to making a resource utilization rate analysis, the resource use efficiency analyzer 330 can further be used to maintain the resource use state database. A part of the result of a resource utilization rate analysis is helpful for future antenna management and thus can be stored into the resource use state database 340 after it is judged whether to perform antenna scheduling. For example, the access networks are flagged for which it is judged in the step S720 that the resource utilization rate is lower due to interference and thus antenna scheduling is required. The resource use information collector 310 can collect information specifically for these flagged access networks to thereby improve the efficiency of the antenna management apparatus.

As described above, the operations of the antenna scheduler 320 to perform antenna scheduling on the access networks to allocate wireless resources may be initiated by the access networks or the resource use efficiency analyzer 330. The antenna scheduler 320 selects the access networks joining antenna scheduling to form an antenna scheduling set according to the resource use state data accessible from the resource use state database 340 and allocates wireless resources to wireless link clusters in the antenna scheduling set to thereby perform antenna scheduling.

Operations of the antenna selector 321 in the antenna scheduler 320 to select the access networks joining antenna scheduling to form an antenna scheduling set will be described below with reference to FIG. 8 and FIG. 9.

Figure 8:
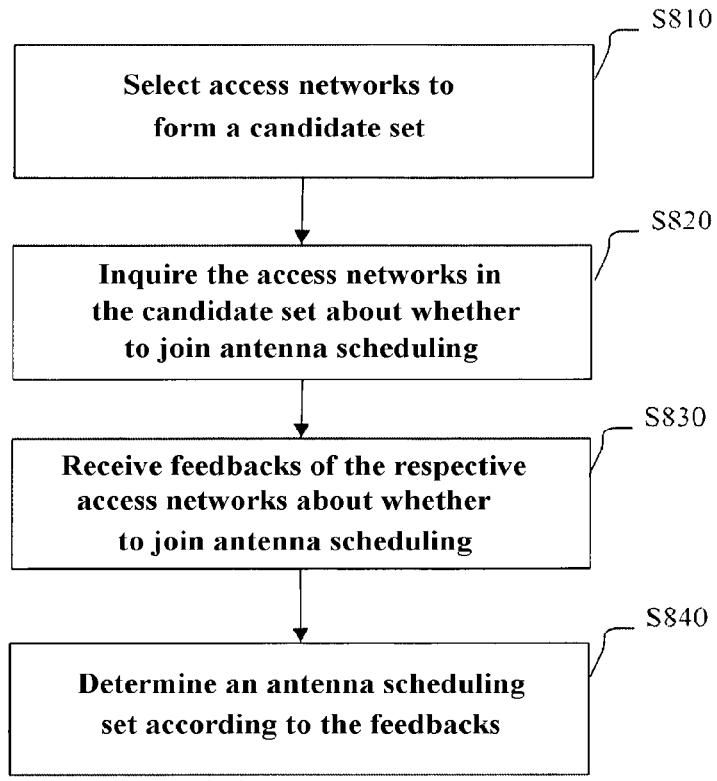
FIG. 8 illustrates a flow chart of forming an antenna scheduling set by an antenna selector according to one embodiment of the invention.

In an embodiment as illustrated in FIG. 8, in the step S810, the antenna selector 321 selects the access networks to form candidate antenna scheduling sets according to network features of the access networks, e.g., coverage ranges, geographical distributions, available spectrum resources, adopted radio technologies, spectrum utilization efficiencies and other factors. The access networks using the same spectrum resource are grouped into the same candidate antenna scheduling set. By way of an example, two methods of selecting access networks to form candidate antenna scheduling sets will be given below.

In one method, a set of radio access networks served by the antenna management apparatus 300 is assumed as V, where each element represents one access network v∈V. A set of available resources is assumed as S, where each element s∈S represents a segment of spectrum resource. The antenna selector 321 selects from V the radio access network using a spectrum resource $s_1 \in S$ to form a candidate antenna scheduling set $U_1$; selects from V the radio access network using a spectrum resource $s_2 \in S$ to form a candidate antenna scheduling set $U_2$; and so on, and selects from V a number I of disjoint candidate antenna scheduling sets $U_1, U_2, \ldots, U_I$ for which antenna scheduling is required, that is, $\Sigma_{1 \leq i \leq I} U_i \subseteq V$ and $U_i \cap U_j = \phi, 1 \leq i \neq j \leq I$, as candidate antenna scheduling sets.

In the other method, a set of radio access networks served by the antenna management apparatus 300 is assumed as V, and the set U of access networks for which antenna scheduling is required is obtained from the resource use efficiency analyzer 330. Each access network v∈U in U has a low resource utilization rate resulting from interference. Access networks in V using the same spectrum resource as v are selected to form a candidate set $U_1$; $U-U_1$ is taken as a new set U, and the foregoing operations are performed on the new set U until U becomes a null set. Thus, a number I of disjoint sets $U_1, U_2, \ldots, U_I$, that is, $\Sigma_{1 \leq i \leq I} U_i \subseteq V$ and $U_i \cap U_j = \phi, 1 \leq i \neq j \leq I$, can be selected from V as candidate antenna scheduling sets.

Further referring to FIG. 8, in the step S820, the antenna selector 321 inquires the access networks in the candidate antenna scheduling set about whether to join current antenna scheduling. The antenna selector 321 sends a join schedule request signaling JoinSchedule_request($U_1$) to the access networks in $U_1$ to inquire them about whether to join current antenna scheduling of the set $U_1$ and sends a signaling JoinSchedule_request($U_2$) to the access networks in $U_2$ to inquire them about whether to join current antenna scheduling of the set $U_2$; and this inquiry process is repeated for all the other sets $U_3, \ldots, U_I$ in sequence.

Then, in the step S830, the antenna selector 321 receives feedbacks of the respective access networks as to join antenna scheduling. The respective access networks determine whether to join current antenna scheduling according to their own resource occupying priorities, resource utilization rates and performance statistical results and feed it back to the antenna selector with a join schedule response signaling JoinSchedule_reply: if the signaling is True, then it indicates joining; and if it is False, then it indicates no joining. The respective access networks can further return their own amounts of required resources and pre-scheduling results to the antenna selector 321 as reference information for antenna scheduling.

In the step S840, the antenna selector 321 finally determines the respective antenna scheduling sets $U_1, U_2, \ldots, U_I$ according to the feedbacks of the respective access networks. For example, those access networks which do not join current scheduling can be removed from the candidate antenna scheduling set, or those access networks which do not join scheduling can be flagged.

A feedback of an access network can relate to the following several types:

(1) The access network $v_1$ has a high spectrum resource occupying priority and a statistic shows a high resource utilization rate thereof, so the access network $v_1$ chooses to continue the use of its own scheduling scheme instead of joining antenna scheduling. However, in order to prevent the access network $v_1$ from being interfered by another access network, the access network $v_1$ feeds its own scheduling result, i.e., pre-scheduling result, back to the antenna selector 321 hoping that the antenna management apparatus avoids interference thereto while performing antenna scheduling.

(2) The access network $v_2$ also with a high priority but with a low resource utilization rate over a past period of time accepts joining antenna scheduling for improved performance thereof.

(3) The access network $v_3$ with a low resource occupying priority can not have a resource available upon resource contention with a highly prioritized user, and a statistic shows that the access network has a low chance of accessing a resource over a long period of time. Thus, $v_3$ wishes to join antenna scheduling for a higher chance of accessing a resource.

(4) The access network $v_4$ with a low resource occupying priority has good performance although it did not join antenna scheduling over a past period of time, so it wishes to continue the use of its own scheduling scheme instead of joining antenna scheduling.

The antenna selector 321 classifies the access networks in the candidate set into four categories according to whether to join antenna scheduling and spectrum use priorities upon obtaining the feedback results: the first category relates to a high spectrum use priority without joining antenna scheduling; the second category relates to a high spectrum use priority and joining antenna scheduling; the third category relates to a low spectrum use priority without joining antenna scheduling; the fourth category relates to a low spectrum use priority and joining antenna scheduling.

The antenna management apparatus 300 can adopt different process strategies for different types of access networks. For example, for the first category of access network, the pre-scheduling result provided from the access network is taken as a reference for antenna scheduling, and an influence on the scheduling result is avoided as much as possible while allocating a wireless resource. For the second category of access network, antenna scheduling is performed and a wireless resource is allocated preferentially to thereby ensure a high resource utilization rate thereof. For the third category of access network, no operation is performed. For the fourth category of access network, antenna scheduling is performed, but no chance of using a wireless resource will be guaranteed.

Figure 9:
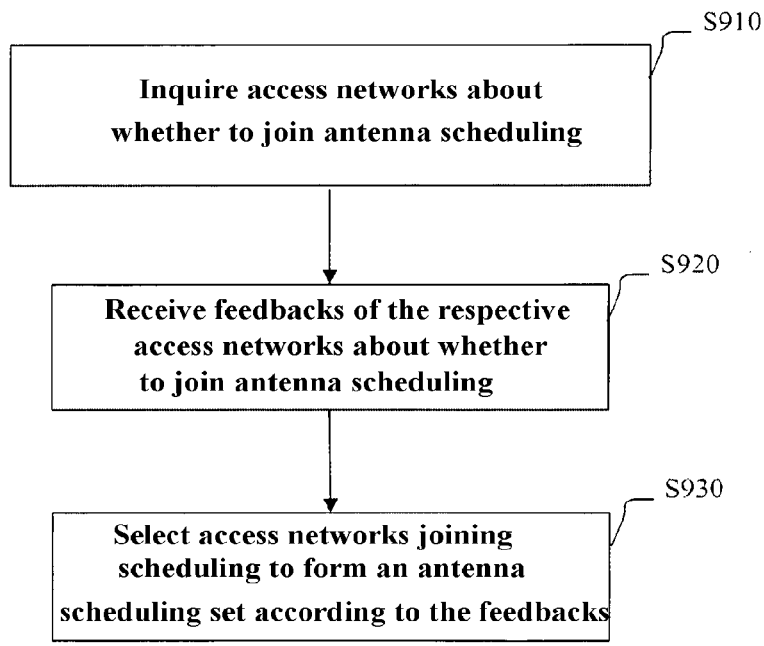
FIG. 9 illustrates a flow chart of forming an antenna scheduling set by an antenna selector according to another embodiment of the invention.

FIG. 9 illustrates another example of operations of the antenna selector 321 to select the access networks joining antenna scheduling to form an antenna scheduling set. A difference of the example in FIG. 9 from that in FIG. 8 lies in that the antenna selector 321 firstly inquires the access networks served by the antenna management apparatus about whether to join antenna scheduling and then selects the access networks joining antenna scheduling to form an antenna scheduling set. As illustrated, in the step S910, the antenna selector 321 inquires the access networks served by the antenna management apparatus whether to join antenna scheduling. In the step S920, the antenna selector 321 receives feedbacks of the respective access networks as to join antenna scheduling. In the step S930, the antenna selector 321 selects the access networks joining antenna scheduling to form an antenna scheduling se according to the feedbacks of the access networks, where the access networks using the same spectrum resource are grouped into the same candidate antenna scheduling set.

After the antenna scheduling set is formed, the link cluster determiner 322 in the antenna scheduler 320 groups wireless links of each access network in the antenna scheduling set into one or more wireless link clusters. The resource scheduler 323 allocates wireless resources to all the wireless link clusters of the antenna scheduling set so that interference between all the wireless link clusters is within a predetermined range. Actually, an antenna-scheduled object is a wireless link cluster in an access network joining scheduling.

In a wireless network, a scheduled object is typically a wireless link in an access network to join scheduling. There are a large number of wireless links in a wireless network, particularly a wireless communication network where scheduling is performed periodically. In order to lower the amount of calculation required for scheduling, wireless links are clustered in the invention into a wireless link cluster as a scheduling unit.

By way of an example, a possible method of clustering wireless links is as follows:

For a network with a central control node, each wireless link between infrastructure nodes (e.g., a base station and a relay node) forms separately a wireless link cluster; and a wireless link between an infrastructure and a user served directly by the infrastructure forms a wireless link cluster between the infrastructure and the user, particularly downlink wireless links between the infrastructure and a plurality of users served directly by the infrastructure can form one or more wireless link clusters, and uplink wireless links between the infrastructure and the plurality of users served directly by the infrastructure can form one or more wireless link clusters.

For a peer-to-peer network, each wireless link forms separately one wireless link cluster.

In general, a wireless link cluster can be formed of one or more wireless links in the same access network which have the same transmitting node or the same receiving node.

For the sake of a convenient description, a wireless link cluster can be described by the following parameters in an embodiment of the invention.

(a) Wireless Link Cluster Identifier Link_id

A wireless link cluster identifier relates to an antenna identifier Antenna_id and a link cluster direction identifier Direction_id. An antenna identifier Antenna_id is a unique identifier of antenna in a range served by a heterogeneous access network manager to which the antenna belongs and can be formed of a cell identifier Cell_id and an antenna identifier Subcell_id of the antenna in a cell. A link cluster direction identifier Direction_id is only for an access network with a central control node. There are two link cluster directions: an uplink link cluster UL is a flow direction of a data stream toward the central control node, and a downlink link cluster DL is a flow direction of a data stream away from the central control node.

A possible identification method will be given below as an example. For a network with a central control node, a wireless link cluster (including a single wireless link) between infrastructure nodes (e.g., a base station and a relay node) is identified by a transmitting antenna and a receiving antenna denoted as (txAntenna_id,rxAntenna_id). A wireless link cluster between an infrastructure node and a user is identified by an antenna and a link cluster direction. Specifically, a downlink link cluster is identified by a transmitting antenna and a downlink link cluster direction denoted as (txAntenna_id,DL), and the wireless link cluster at this time includes downlink wireless links between the infrastructure and a plurality of users served directly by the infrastructure; and an uplink link cluster is identified by a receiving antenna and an uplink link cluster direction denoted as (rxAntenna_id,UL), and the wireless link cluster at this time includes uplink wireless links between the infrastructure and the plurality of users served directly by the infrastructure.

When downlink (or uplink) wireless links between an infrastructure and a plurality of users served directly by the infrastructure form a plurality of wireless link clusters, typically a downlink (or uplink) wireless link between one transmitting (or receiving) antenna in the infrastructure and a user served directly by the infrastructure is grouped into one wireless link cluster. Thus in this case, different wireless link clusters can be well distinguished by the wireless link cluster identifier described above.

For a peer-to-peer network, a wireless link cluster (including a single wireless link) is identified by a transmitting antenna and a receiving antenna of the included wireless link denoted as (txAntenna_id,rxAntenna_id).

(b) Transmitting Antenna Type txAntenna_type

Figure 10:
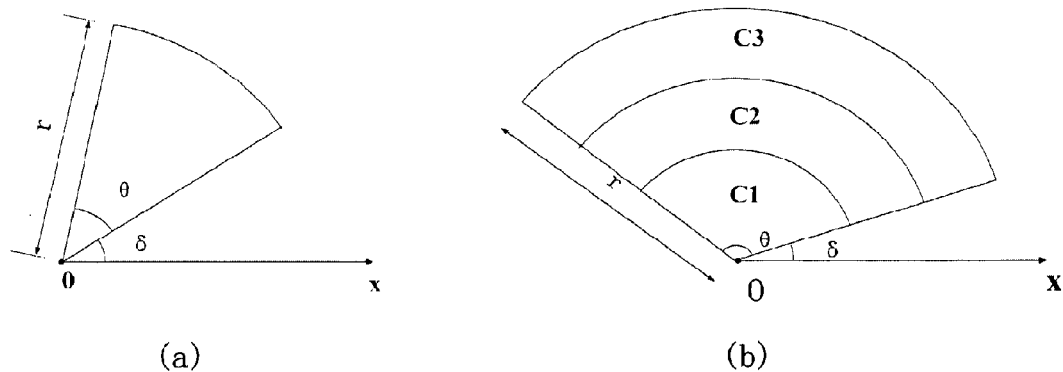
FIG. 10 illustrates a schematic diagram of a representation of an antenna-scheduled object according to one embodiment of the invention.

A transmitting antenna type of a wireless link cluster includes an omni-directional antenna, a directional antenna, a smart antenna and a set of antennas, where the set of antennas describes a wireless link cluster formed of a plurality of uplink links with the same receiving node. An antenna type is described by an antenna beam. An antenna beam is described by three parameters $(\delta,\theta,r)$ as illustrated in the part (a) of FIG. 10. FIG. 10 illustrates a schematic diagram of a representation of an antenna-scheduled object according to one embodiment of the invention. In the figure, o represents the location of an antenna. x represents a reference direction which will be the same as antennas in a range served by the same heterogeneous access network manager. $\theta$ represents the radiation angle of an antenna beam. For example, the value of $\theta$ for an omni-directional antenna is 360°, the value of $\theta$ for a 120-degree directional antenna is 120°, and the value of $\theta$ for a smart antenna ranges from 0~360°. $\delta$ represents a deflection angle of the radiation angle of the antenna beam relative to the reference direction, and the value of $\delta$ for an omni-directional antenna is typically 0°. r represents the radiation radius of the antenna beam which can be defined as the average distance from the location of the antenna to a location with a signal field strength attenuated below a predetermined threshold. The result of power control will influence the value of r in that power control typically has r take several discrete values in the range of $0 \sim r_{max}$ with $r_{max}$ being the maximum value of r. A beam description of a set of antenna will be described by an envelope of antenna beams of respective transmitting antennas in the set of antennas. The envelope of the beam of the set of antenna is defined as a convex curve with the least area including the antenna beams of all the transmitting antennas. For the least effort of calculation in practice, an antenna beam of a transmitting antenna of a wireless link cluster can be described approximately as a sector (including a round) with the least area including all the antenna beams. If this is approximated as a round, then the transmitting antenna of the wireless link cluster is processed as an omni-directional antenna, that is, the type of the transmitting antenna of the wireless link cluster is an omni-directional antenna; and if this is approximated as a sector, then the transmitting antenna of the wireless link cluster is processed as a directional antenna, that is, the type of the transmitting antenna of the wireless link cluster is a directional antenna. The vertex of the sector or the circumference of the round is the location of the approximate directional antenna or omni-directional antenna. In this context, an antenna beam of a wireless link cluster refers to an antenna beam of a transmitting antenna in the cluster. Following the description above, an antenna beam of an uplink wireless link cluster is an antenna beam approximated from an envelope of antenna beams of respective transmitting antennas in a set of antennas thereof.

(c) Bandwidth Requirement Vector BW_req of Wireless Link Cluster

An element in a bandwidth requirement vector represents a bandwidth requirement of a wireless link in a coverage range of an antenna beam at a different power level in power control.

In the method of identifying a wireless link cluster in this context, for a network with a central control node, one downlink wireless link cluster between an infrastructure and a user can represent a plurality of wireless links with the same transmitting node but different receiving nodes. In view of a variation of a coverage range with a signal at a high quality due to power control, thus a plurality of points corresponding to the wireless link cluster are naturally grouped. A downlink bandwidth requirement vector is formed as follows: as illustrated in the part (b) of FIG. 10, where there are three power levels for an antenna beam $(\delta,\theta,r)$ of an antenna o, and their signals at a high quality cover a region C1, the region C1 and a region C2, and the regions C1 and C2 and a region C3 respectively. Correspondingly, there are three bandwidth requirement regions C1, C2 and C3 divided in the radiation radius direction of the antenna beam, where the antenna o is an antenna of the same transmitting node of wireless links in the wireless link cluster. Here, a bandwidth requirement of C1 is defined as the sum of downlink bandwidth requirements of all the wireless links formed of nodes in the region C1 and the antenna o, and the same applies to C2 and C3. The bandwidth requirement vector of the wireless link cluster (corresponding to a first bandwidth requirement which can be predetermined, for example, typically as a actual bandwidth requirement) is a one-dimension vector including three elements formed of the bandwidth requirements of C1, C2 and C3. In a peer-to-peer network, respective wireless link clusters relate to only a unique transmitting node and a unique receiving node, so all the bandwidth requirement vectors of the wireless link clusters are a one-dimension vector including only one element. For a network with a central control node, one uplink wireless link cluster between an infrastructure and a user represents a plurality of wireless links with the same receiving node but with different transmitting nodes. When a bandwidth demand vector of a downlink wireless link cluster is formed, uplink bandwidth requirements of uplink wireless links in respective bandwidth requirement regions corresponding thereto are summed as a bandwidth requirement vector of an uplink wireless link cluster symmetric to the downlink wireless link cluster, and also a beam of the uplink wireless link cluster is hereby determined. Due to symmetry of a wireless communication link, when communication directions of the respective wireless links in the downlink wireless link cluster are reversed, these reversed wireless links form the uplink wireless link cluster symmetric to the downlink wireless link cluster, and a transmitting node in the downlink wireless link cluster is a receiving node in the uplink wireless link cluster symmetric thereto, and a receiving node in the downlink wireless link cluster is a transmitting node in the uplink wireless link cluster symmetric thereto, or vice versa. Still taking the part (b) of FIG. 10 as an example, a bandwidth requirement of the bandwidth requirement region C1 of the uplink wireless link cluster is defined as the sum of uplink bandwidth requirements of all the wireless links formed of nodes in the region C1 and the antenna o, and a beam of the uplink wireless link cluster is represented as an envelope of beams of all the uplink wireless links formed of the nodes in the region C1 and the antenna o, and the same applies to C2 and C3. The bandwidth requirement vector of the uplink wireless link cluster (corresponding to a first bandwidth requirement which can be predetermined, for example, typically as actual bandwidth requirement) is a one-dimension vector including three elements formed of the uplink bandwidth requirements of C1, C2 and C3.

With the bandwidth demand vector of a wireless link cluster, a bandwidth requirement of an access network can be zoned in order for a finer granularity of antenna scheduling and a further improved resource utilization rate.

When the antenna scheduler 320 allocates wireless resources to the wireless link clusters of the access networks in the antenna scheduling set, it is necessary to have interference between the wireless link clusters within a predetermined range. Since access networks in the antenna scheduling set use the same spectrum resource, interference may arise from transmission of data between wireless link clusters over the same resource at the same time, which can also be referred to as exclusion restriction of antenna scheduling. Here, the extent of interference between link clusters can be represented by the concept of exclusion degrees.

The value of an exclusion degree ranges from [0,1], where 0 represents that there is absolutely no exclusion, that is, data is transmitted between wireless link clusters over the same resource at the same time without any mutual interference, and 1 represents absolute exclusion, that is, the same resource absolutely can not be used at the same time between wireless link clusters. Other values represent exclusion degrees between the two, where a larger value represents a higher exclusion degree. For example, if there is a sufficiently long distance between two wireless link clusters a and b, and when they use the same resource, interference of a transmission signal of a to a receiver of the wireless link cluster b can be neglectable (with a signal to noise ratio above a very high threshold), and then exclusion of a to b can be considered as 0, denoted as a⊓b=0. In another example, there are two wireless link clusters c and d between a specific transmitting node and two different signal receiving nodes, and if the transmitting node is equipped with only a single transmitting system, then c and d can not operate concurrently, so c and d are absolutely exclusive, denoted as c⊓d=1 and d⊓c=1. It is worthy noting that there is no symmetry of the exclusion-restrictive relationship, that is, a ⊓ b may not be equivalent to b⊓a.

To have interference between wireless link clusters within a predetermined range is to have exclusion degrees between the wireless link clusters below a predetermined value.

For two wireless link clusters with common transmitting node or receiving node, absolute exclusion between the wireless link clusters due to a physical reason (e.g., an antenna of only a single signal transmission or reception device is equipped) can be inferred directly. This exclusion will not be changed without altering the device.

For two wireless link clusters without any common transmitting node or receiving node, an exclusion degree can be measured or calculated. Two wireless link clusters a and b are assumed, where transmitting and receiving antennas of a are denoted as a_tx and a_rx, and transmitting and receiving antennas of b are denoted as b_tx and b_rx. Here, when one wireless link cluster includes a plurality of wireless links, the following measurement and calculation can be performed on all the transmitting antennas and receiving antennas in the wireless link cluster. However, for the sake of convenient operations, the following measurement and calculation can be performed only on approximate transmitting antennas corresponding to an envelope of a beam of the set of antennas or only on antennas at the edges of the wireless link cluster. For example, for a downlink wireless link cluster, an antenna of a receiving node at the edge of the cluster can be taken as a receiving antenna; and for an uplink wireless link cluster, an antenna of a transmitting node at the edge of the cluster can be taken as a transmitting antenna, or approximate transmitting antennas corresponding to an envelope of a beam of the set of antennas can be taken as a transmitting antenna.

Measurement: a signal is transmitted from a_tx to a_rx and a signal is transmitted from b_tx to b_rx in a specific timeslot; and in the meantime, a_rx calculates the signal to noise ratio $SNR_b^a$ of the received signal of a_tx to noise arising from transmission of the signal from b_tx. Alike, b_rx calculates the signal to noise ratio $SNR_a^b$ of the received signal of b_tx to noise arising from transmission of the signal from a_tx.

Calculation: The signal to noise ratio $SNR_b^a$ can be calculated from the known distance between a_tx and a_rx distance between b_tx and a_rx, and transmission power of the signals of a_tx and b_tx. Alike, $SNR_a^b$ can be calculated.

The measured or calculated signal to noise ratios $SNR_b^a$ and $SNR_a^b$ are mapped into the range of [0,1]. By way of an example, the distribution of a signal to noise ratio ($SNR_{min}$, $SNR_{max}$) is discretized, for example, the distribution range of the signal to noise ratio is divided into m>1 intervals ($SNR_{min}$,$SNR_1$], ($SNR_1$,$SNR_2$], . . . , ($SNR_{min-1}$,$SNR_{max}$), these m intervals correspond respectively to real numbers 1, (m−2)/(m−1), . . . , 1/(m−1), 0. Then, the signal to noise ratio $SNR_b^a$ can be translated into an exclusion degree of the link cluster b to the link cluster a, and the signal to noise ratio $SNR_a^b$ can be translated into an exclusion degree of the link cluster a to the link cluster b.

In order to make scheduling by the antenna management apparatus 300 more reasonable, preferably another scheduling restrictive factor, i.e. preceding restriction can further be taken into account. When there is relay node in an access network, the relay node is responsible only for forwarding data but does not generate new data in itself, so the relay node can transmit data only after receiving the data to be transmitted. Stated otherwise, transmission of data from the relay node can not precede its reception of the corresponding data. This restrictive relationship is described as a preceding restriction. When a wireless resource is allocated, a resource can be allocated to a forwarding link cluster only after a resource is allocated to a preceding link cluster of the forwarding link cluster in view of this preceding restriction. A forwarding link cluster is a wireless link cluster between one relay node and another relay node (a peer node), and a forwarding link cluster typically includes only one wireless link.

The preceding restrictive relationship can be derived from a relationship between link clusters in a plurality of networks. For example, if there are two adjacent link clusters a and b, and a flow direction of data is from a to b, that is, b will forward data received from a, then forwarding by b can not precede transmission from a to b.

According to one embodiment of the invention, the link cluster determiner 322 in the antenna scheduler 320 can determine an exclusion degree and a preceding-restrictive relationship between the wireless link clusters.

Operations of the resource scheduler 323 in the antenna scheduler 320 to allocate wireless resources to the wireless link clusters will be described below with reference to FIG. 11 to FIG. 13.

The resource scheduler 323 enables wireless resources to be made full use of as much as possible to maximize the total throughout of the scheduled access networks while satisfying the scheduling restrictive factor in allocation of the wireless resources to the wireless link clusters and sends a scheduling result to the access network after performing scheduling. Taking allocation of resources in the time domain as an example (at this time, antennas of the respective access networks in the antenna scheduling set can use all the resources in the frequency domain and resources in the code domain in the scheduling set concurrently), the wireless resources are allocated based upon the pre-scheduling results of the access networks, and wireless link clusters are selected for each timeslot and their antenna beams thereof are determined under the principle of ensuring interference between the wireless link clusters to be within a tolerance range while having antennas as many as possible operate in each timeslot so that all the data transmission tasks of the access networks can be performed in the least number of timeslots.

By way of an example, the resource scheduler 323 performs resource scheduling by allocating wireless resources to the wireless link clusters determined by the link cluster determiner 322 in the antenna scheduling sets $U_1, U_2, \ldots, U_I$ obtained by the antenna selector 321. A method of scheduling a resource will be described taking only $U_i, i \in [1, I]$ as an example, where there is assumed a set $\Gamma_i$ is formed of wireless link clusters in $U_i$, and elements in $\Gamma_i$, i.e., wireless link clusters, are $\phi_1, \phi_2, \ldots, \phi_J$ respectively. Each wireless link cluster has a bandwidth requirement which is an intermediate quantity with an initial value being set to a first bandwidth demand of the wireless link cluster. For a forwarding link cluster, i.e., a link cluster between one relay node and another relay node, an initial value of a bandwidth requirement thereof is set to 0. For the sake of convenience for description below, an initial value of a first bandwidth requirement of a forwarding link cluster can also be considered as being set to 0.

Figure 11:
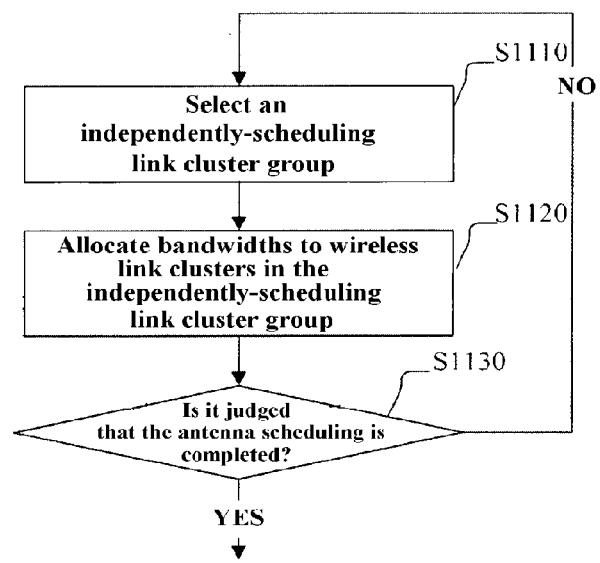
FIG. 11 illustrates a flow chart of allocating a wireless resource by a resource scheduler according to one embodiment of the invention.

FIG. 11 illustrates a flow chart of allocating a wireless resource by the resource scheduler according to one embodiment of the invention. This figure is for a detailed description of the step S430 in FIG. 4.

As illustrated in FIG. 11, in the step S1110, the resource scheduler 323 selects an independently-scheduling link cluster group from all the wireless link clusters in one antenna scheduling set. The independently-scheduling link cluster group is defined as a group of link clusters in the set of wireless link clusters $\Gamma_i$ with an antenna beam of each wireless link cluster being set so that interference between the wireless link cluster and each other wireless link cluster in the independently-scheduling link cluster group is within a predetermined tolerant range (that is, does not influence the quality of service of a user) to thereby ensure their compliance with the excusive restrictive condition. It is necessary to have antennas as many as possible operate concurrently at each time to thereby make full use of the resources.

Figure 12:
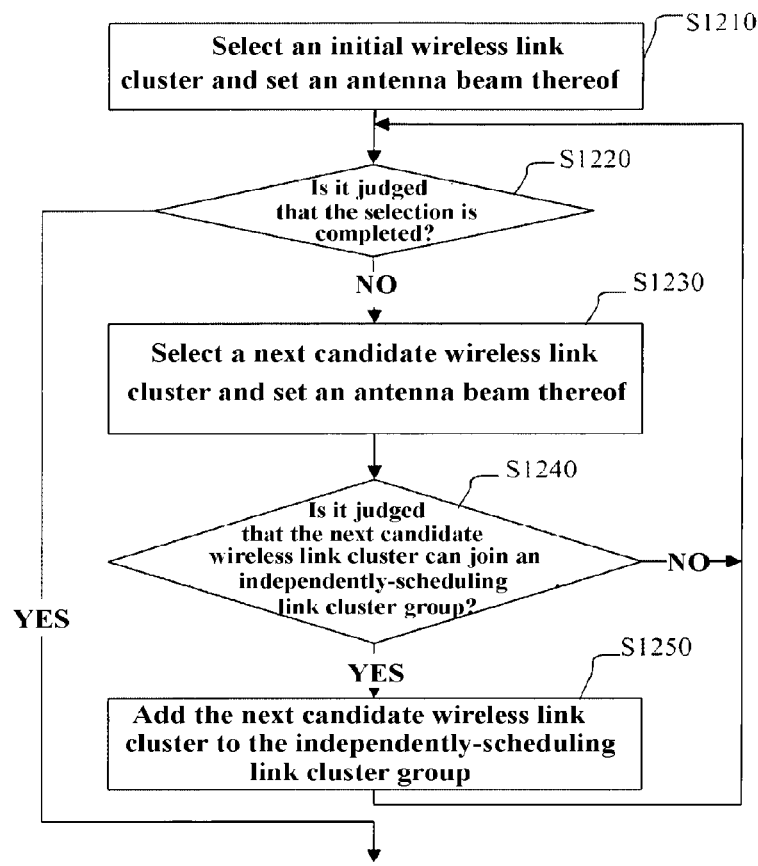
FIG. 12 illustrates a flow chart of selecting an independently-scheduling link cluster group by a resource scheduler according to one embodiment of the invention.

FIG. 12 illustrates a flow chart of selecting an independently-scheduling link cluster group from all the wireless link clusters in one antenna scheduling set by the resource scheduler according to one embodiment of the invention. In the following description, two new intermediate variables will be used respectively as a set of link clusters $\Lambda$, which represents an independently-scheduling link cluster group; and a set of link clusters $\Psi$, which records unexamined link clusters in the set of link clusters $\Gamma_i$ of the antenna scheduling set $U_i$. Before wireless link clusters are selected and added to the independently-scheduling link cluster group, these two intermediate variables are initialized by setting $\Lambda$ to a null set $\phi$ and $\Psi$ to $\Gamma_i$.

In the step S1210, the resource scheduler 323 selects one wireless link cluster from the wireless link clusters in the antenna scheduling set as an initial wireless link cluster of the independently-scheduling link cluster group and sets an antenna beam of the initial wireless link cluster.

For the example above, an initial wireless link cluster is selected from the set of link clusters $\Psi$ and denoted as $\hat{\phi} \in \Psi$. Only a wireless link cluster with a current bandwidth requirement above 0 needs to be allocated a wireless resource. $\hat{\phi}$ can be selected in numerous ways: any wireless link cluster with a bandwidth requirement above 0 can be selected from $\Psi$; any wireless link cluster with a bandwidth requirement above 0 at a high spectrum use priority can be selected from $\Psi$; a wireless link cluster with the highest bandwidth requirement can be selected; or a wireless link cluster in an access network geographically located centrally in $\Psi$ can be selected.

An antenna beam of the initial wireless link cluster is set. If the type of transmitting antenna of $\hat{\phi}$ is an omni-directional antenna or a directional antenna, then both a radiation angle $\theta$ and a deflection angle $\delta$ of the antenna beam have been determined, and a radio radius r thereof is determined by a power level. The power level can be selected arbitrarily in a range of values. If the type of transmitting antenna of $\hat{\phi}$ is a smart antenna, then three parameters $(\delta, \theta, r)$ of the antenna beam thereof can be set freely in ranges of values, where a specific radiation radius r corresponds to a specific power level. Since a smart antenna has flexible ranges of options and thus a higher chance of being scheduled, preferably a link cluster with an omni-directional antenna or a directional antenna can be selected as an initial wireless link cluster as much as possible.

Then, selected $\hat{\phi}$ is added to $\Lambda$ and removed from $\Psi$.

Next, in the step S1220, the resource scheduler 323 judges whether the selecting an independently-scheduling link cluster group has been completed. If not so, then the flow proceeds to the step S1230; otherwise, the process of selecting the independently-scheduling link cluster group ends, and the flow will proceed to the step S1120 in FIG. 11. Each time one link cluster in has been considered, the link cluster will be removed from $\Psi$, so $\Psi$ will become a null set after all the link clusters have been considered. Thus, the determination in the step S1220 can be performed as to whether $\Psi$ is a null set. If $\Psi$ is a null set, then it indicates that the selection process has been completed. If $\Psi$ is not null, then it indicates that the selection process has not be completed, and the flow proceeds to the step S1230.

In the step S1230, the resource scheduler 323 selects a next candidate wireless link cluster to be added to the independently-scheduling link cluster group from the remaining wireless link clusters between the antennas of the access networks in the antenna scheduling set and sets an antenna beam thereof. In the step S1240, the resource scheduler 323 judges whether the next candidate wireless link cluster can be added to the independently-scheduling link cluster group. If so, then in the step S1250, the next candidate wireless link cluster is added to the independently-scheduling link cluster group, and then the flow returns to the step S1220; otherwise, the flow returns directly to the step S1220.

For the example above, a wireless link cluster is selected from $\Psi$, $\phi \in \Psi$, as a next candidate wireless link cluster, and an antenna beam thereof is set, and it is judged whether a new independently-scheduling link cluster group can be formed by setting the antenna beam and adding to $\Lambda$. If so, then $\phi$ is added to $\Lambda$ and removed from $\Psi$; otherwise, $\phi$ is removed from $\Psi$.

The wireless link cluster $\phi$ can be selected randomly from $\Psi$. In order to further improve a resource utilization rate, $\phi 0$ can be selected sequentially so that more antennas can operate concurrently. For example, $\phi$ can be selected as follows. Wireless link clusters are connected according to their exclusion degrees so that the link clusters with exclusion degrees above 0 are connected by directionless lines. The least number of directionless lines through one of two link clusters reach the other link cluster is referred to as an exclusion distance between these two link clusters. In other words, an exclusion distance between two wireless link clusters refers to the least number of wireless link clusters with interference through which one of the two wireless link clusters reach the other wireless link cluster. Link clusters in $\Gamma_i$ can be divided by exclusion distances into sets of link clusters $\Psi_1, \Psi_2, \ldots$ at the distances of $1, 2, \ldots$, to the initial wireless link cluster $\hat{\phi}$. Then, a next candidate wireless link cluster is selected from $\Psi_1, \Psi_2, \ldots$ in that order. Furthermore, preferably an omni-directional antenna, a directional antenna and a smart antenna can selected in that order in each of the sets of link clusters $\Psi_1, \Psi_2, \ldots$. An antenna can be selected randomly among the same type of antennas.

After the next candidate wireless link cluster $\phi$ is selected, $\phi$ and each wireless link cluster in $\Lambda$, $\kappa \in \Lambda$, are considered sequentially. For each $\kappa$ and a setting of an antenna beam thereof, settings of an antenna beam of $\phi$ with interference with $\kappa$ being within a predetermined range (e.g., a tolerant range) is found, and then all these settings of antenna beam of $\phi$ are intersected. If there is an intersection set, then it is considered that $\phi$ with the settings of an antenna beam in this intersection set can be added to $\Lambda$ and removed from $\Psi$. If there is no such an intersection set, then it indicates that no antenna beam of $\phi$ can be set so that interference between $\phi$ and each wireless link cluster $\kappa$ in the independently-scheduling link cluster group $\Lambda$ is within the predetermined range, and $\phi$ is only removed from $\Psi$.

When an antenna beam of $\phi$ is set for each $\kappa$, if the type of transmitting antenna of $\phi$ is an omni-directional antenna or a directional antenna, then the signal to noise ratio of an edge user of the antenna beam at a preset power level of $\phi$ and $\kappa$ is calculated from the highest power level of $\phi$. If the signal to noise exceeds, for example, a tolerant range, than an attempt is made to lower the power level of $\phi$ until the signal to noise reaches the tolerant limit. After the power level is set, a radiation radius is a radius corresponding to a coverage range corresponding to the power level.

If the type of transmitting antenna of $\phi$ is a smart antenna, then a radiation angle of the antenna beam of $\phi$ can further be divided equally into a plurality of sub-radiation angles, that is, circumferentially divided equally into a plurality of sectors, in addition to setting the power level and the antenna beam as described above. For the respective sections, appropriate power levels are derived in a way similarly to that for a directional antenna and then combined for the two different purposes of maximizing either the power level or the radiation angle. Stated otherwise, the power level of the combined-into antenna beam is maximized (which means the maximized radiation radius), or the radiation angle of the combined-into antenna beam is maximized. For improved accuracy, bandwidth requirements of the respective sector region can further be taken into account for combination without combining those sectors with a bandwidth requirement of 0.

Figure 13:
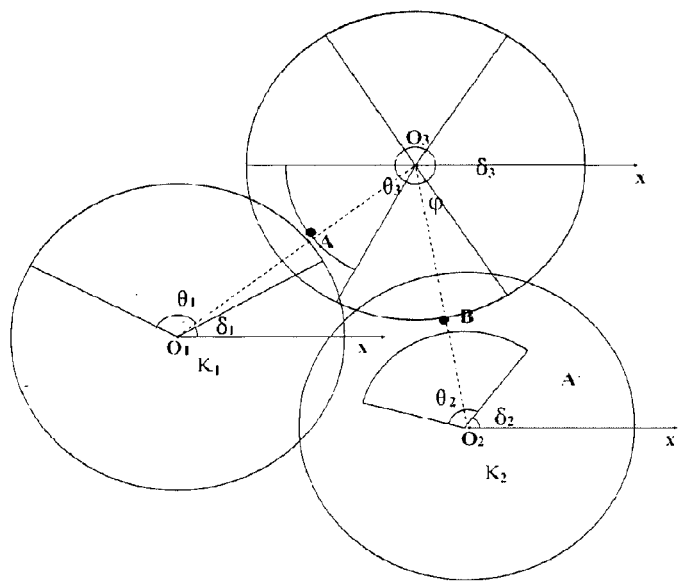
FIG. 13 illustrates a schematic diagram of an antenna beam setting according to one embodiment of the invention.

FIG. 13 illustrates an example of an antenna beam setting of a smart antenna. In the scenario illustrated in FIG. 13, there are elements $\kappa_1$ and $\kappa_2$ in $\Lambda$. Antenna beam parameters of $\kappa_1$ and $\kappa_2$ are $(\delta_1,\theta_1,r_1)$ and $(\delta_2,\theta_2,r_2)$ respectively. $\phi$ is a candidate wireless link cluster for which an antenna beam is to be set. An antenna radiation angle of $\phi$ is divided equally into six sectors, and an antenna beam setting of each sector with interference with $\kappa_1$ and $\kappa_2$ being within a predetermined range is calculated respectively. A calculation result is as follows. With respect to $\kappa_1$, if the radiation angle is maximized, then the radiation radius is $o_3A$; and if the radiation radius is maximized, then the radiation angle is $\theta_3=300°$ (⅚ of a circumference), and the deflection angle is $\delta_3=240°$. With respect to $\kappa_2$, both the radiation angle and the radiation radius can be maximized at the same time. The antenna beams in the respective sectors are combined, and if the power level is maximized, then parameters of $\phi$ are $(\delta_3=240°,\theta_3=300°,r_3=o_3B)$; and if the radiation angle is maximized, then the parameters of $\phi$ are $(\delta_3=0°,\theta_3=360°, r_3=o_3A)$.

The radiation angle of the antenna beam of the smart antenna is divided equally, and then antenna beams of the respective sub-radiation angles are set respectively and further combined in view of an optimization goal to thereby lower effectively the complexity of calculation and determine rapidly the beam setting of the smart antenna.

Referring back to FIG. 11, the resource scheduler 323 allocates bandwidth to the wireless link clusters in the independently-scheduling link cluster group in the step S1120 after selecting the independently-scheduling link cluster group.

For the example above, interference between each wireless link cluster in the independently-scheduling link cluster group $\Lambda$ and each other wireless link cluster in the group is within the predetermined range, bandwidths can be allocated concurrently to all the wireless link clusters. A radiation radius of an antenna beam of a wireless link cluster corresponds to a bandwidth requirement value in a bandwidth requirement vector BW_req of the wireless link cluster, i.e., an element in the bandwidth requirement vector. These values are assumed sequentially as $\beta_1, \beta_2, \ldots, \beta_{|\Lambda|}$, where the minimum value is $\min\{\oplus_i | i \in [1,|\Lambda|]\}$, and the maximum value is $\max\{\beta_i | i \in [1,|\Lambda|]\}$. A bandwidth allocated concurrently to each wireless link cluster in the independently-scheduling link cluster group $\Lambda$ can be set to any value $\beta$ between the minimum value and the maximum value, i.e., $\min\{\beta_i | i \in [1,|\Lambda|]\} \leq \beta \leq \max\{\beta_i | i \in [1,|\Lambda|]\}$. $\beta$ is selected, and a bandwidth requirement of an element in $\Gamma_i$ is modified. For a bandwidth requirement of an element belonging to both $\Gamma_i$ and $\Lambda$:

$$\beta_i = \begin{cases} 0, & \text{if } \beta \geq \beta_i \\ \beta_i - \beta, & \text{if } \beta > \beta_i \end{cases}.$$

For another element in $\Gamma_i$, if the element has a preceding relationship with an element in $\Lambda$, that is, forwards data received from a link cluster of $\Lambda$ (a preceding link cluster), then a bandwidth requirement of the element is increased accordingly by $\beta_i$.

Then in the step S1130 it is judged whether antenna scheduling has been completed. As described above, after a bandwidth is allocated to a wireless link cluster in $\Gamma_i$, the allocated bandwidth is subtracted from a bandwidth requirement of the link cluster (corresponding to a first bandwidth requirement). When all the wireless link clusters have a bandwidth requirement of 0, it indicates that the bandwidth requirements of all the wireless link clusters are satisfied, and then completion of the whole antenna scheduling flow can be judged.

If it is judged in the step S1130 that antenna scheduling has not been completed, then the flow returns to the step S1110 to further select an independently-scheduling link cluster group. If antenna scheduling has been completed, then the flow proceeds to S440 in FIG. 4, and the resource scheduler 323 sends a wireless resource allocation result to the access network in which the wireless link cluster is located.

The wireless resource allocation result can include the wireless resources (e.g., timeslots) allocated to the respective access networks, the antenna beam and the power level of each wireless resource corresponding to each link cluster, etc. Particularly, the bandwidths allocated to the wireless link clusters in the respective access networks can be translated into the wireless resources (e.g., timeslots) allocated to the access networks with existing method.

By way of an example, the antenna management apparatus sends a scheduling result sending request signaling SendSchedule_request to the access networks in sending of the allocation result. The access networks make judgment according to a condition. If reception is allowed, then a scheduling result sending response signaling SendSchedule_reply is True and transmitted to the antenna management apparatus. Otherwise, the scheduling result sending response signaling SendSchedule_reply is set to False and transmitted to the antenna management apparatus. The antenna management apparatus sends the scheduling result upon reception of the response which is True; otherwise, ceases sending the scheduling result and requests again in a subsequent period of time and terminates sending the scheduling result when this period of time or the number of requests exceeds a specific threshold Furthermore, the respective components in the antenna management apparatus according to the embodiment of the invention, e.g., the resource use information collector 310, the resource use efficiency analyzer 320, the antenna scheduler 330, the resource use state database 340, etc., can be centralized on the same network entity or decentralized on different network entities In the method and apparatus according to the embodiments of the invention, access networks joining antenna scheduling among managed access networks are grouped into different antenna scheduling sets, where access networks using the same spectrum resource form the same antenna scheduling set; wireless links in each access network are grouped into one or more wireless link clusters; and wireless resources are allocated to all the wireless link clusters in the antenna scheduling set so that interference between all the wireless link clusters of the antenna scheduling set is within a predetermined range. Thus, access networks as many as possible can operate concurrent over the same spectrum resource within a tolerant interference range to thereby improve a chance of spectrum multiplexing in order for efficient utilization of the resources. Furthermore, as compared with the case that a resource is allocated per wireless link, a wireless resource is allocated per wireless link cluster to thereby lower the amount of calculation required for antenna scheduling.

Furthermore, in the method and apparatus according to the embodiments of the invention, the scope of the invention will not be limited to any specific coverage range, adopted radio technology, network architecture, resource use pattern, etc., of a heterogeneous radio access network. As for an application to the user side, a heterogeneous radio access network in the method and apparatus according to the embodiments of the invention can provide a user with a radio access service by means of various advanced radio technologies including an omni-directional antenna, a directional antenna, a smart antenna, a distributed antenna, etc.

Additionally, the respective constituent modules and units in the apparatus described above can be configured in software, firmware, hardware or any combination thereof. Specific configuration means or patterns available are well known to those skilled in the art, and a repeated description thereof will be omitted here. In the case of being embodied in software or firmware, program constituting the software or firmware can be installed from a storage medium or a network to a computer with a dedicated hardware structure which can perform various functions when various pieces of programs are installed thereon.

Figure 14:
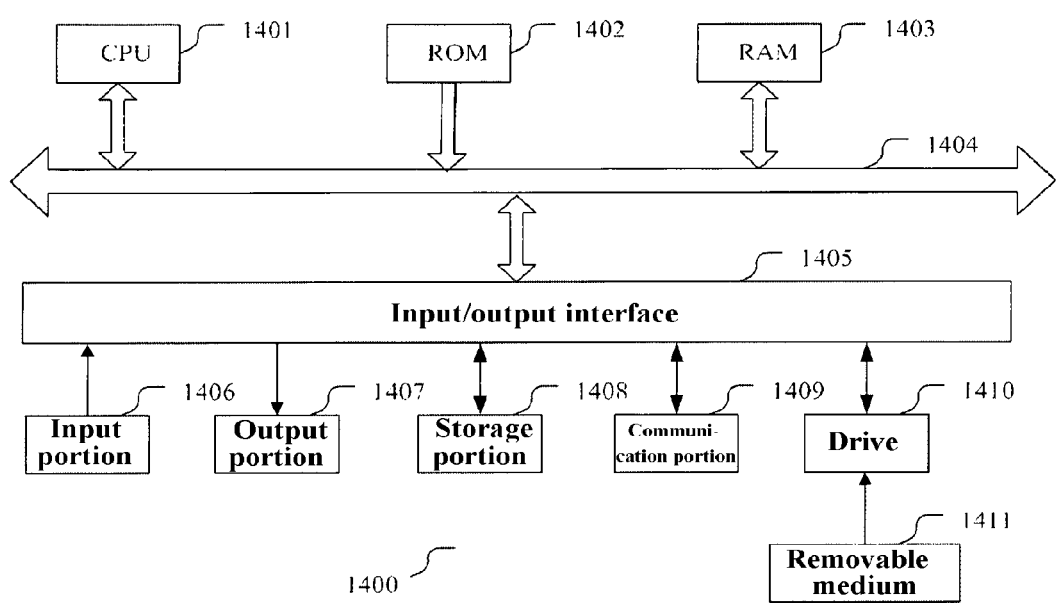
FIG. 14 illustrates a schematic block diagram of a computer in which the method and apparatus according to the embodiments of the invention can be embodied.

FIG. 14 illustrates a schematic block diagram of a computer in which the method and apparatus according to the embodiments of the invention can be embodied. In FIG. 14, a Central Processing Unit (CPU) 1401 performs various processes according to program stored in a Read Only Memory (ROM) 1402 or loaded from a storage portion 1408 into a Random Access Memory (RAM) 1403 in which data required when the CPU 1401 performs the various processes, etc., is also stored as needed. The CPU 1401, the ROM 1402 and the RAM 1403 are connected to each other via a bus 1404 to which an input/output interface 1405 is also connected.

The following components are connected to the input/output interface 1405: an input portion 1406 (including a keyboard, a mouse, etc.); an output portion 1407 (including a display, e.g., a Cathode Ray Tube (CRT), a Liquid Crystal Display (LCD), etc., and a speaker, etc.); a storage portion 1408 (including a hard disk, etc.); and a communication portion 1409 (including a network interface card, e.g., an LAN card, a modem, etc). The communication portion 1409 performs a communication process over a network, e.g., the Internet. A drive 1410 is also connected to the input/output interface 1405 as needed. A removable medium 1411, e.g., a magnetic disk, an optical disk, an optic-magnetic disk, a semiconductor memory, etc., can be installed on the drive 1410 as needed so that computer program read therefrom can be installed into the storage portion 1408 as needed.

In the case that the foregoing series of processes are implemented by software, program constituting the software can be installed from a network, e.g., the Internet, etc., or a storage medium, e.g., the removable medium 1411, etc.

Those skilled in the art shall appreciate that such a storage medium will not be limited to the removable medium 1411 illustrated in FIG. 14 in which the program is stored and which is distributed separately from the apparatus to provide a user with the program. Examples of the removable medium 1411 include a magnetic disk (including a Floppy Disk (a registered trademark)), an optical disk (including Compact Disk-Read Only Memory (CD-ROM) and a Digital Versatile Disk (DVD)), an optic-magnetic disk (including a Mini Disk (MD) (a registered trademark)) and a semiconductor memory. Alternatively, the storage medium can be the ROM 1402, a hard disk included in the storage portion 1408, etc., in which the program is stored and which is distributed together with the apparatus including the same to the user.

Furthermore, the invention further proposes a product program on which machine readable instruction codes are stored. The instruction codes upon being read and executed by a machine can perform the above-mentioned method according to the embodiment of the invention.

Correspondingly, a storage medium for carrying the program product on which the machine readable instruction codes are stored will also be encompassed in the disclosure of the invention. The storage medium includes but will not be limited to a floppy disk, an optical disk, an optic-magnetic disk, a memory card, a memory stick, etc.

In the foregoing description of the specific embodiments of the invention, a feature described and/or illustrated with respect to an implementation can be used identically or similarly in one or more other implementations in combination with or in place of a feature in the other implementation(s).

It shall be emphasized that the term "including/comprising" as used in this context indicates the presence of a feature, an element, a step or a component but does not preclude the presence or addition of one or more other features, elements, steps or components.

Furthermore, the method according to the invention will not necessarily be performed in a sequential order described in the specification but can alternatively be performed in another sequential order, in parallel or independently. Therefore, the technical scope of the invention will not be limited to the order in which the method is performed as described in the specification.

Although the invention has been disclosed above in the description of the specific embodiments of the invention, it shall be appreciated that all the embodiments and examples described above are exemplary but not limiting. Those skilled in the art can make various modifications, improvements or equivalents to the invention without departing from the spirit and scope of the appended claims. These modifications, improvements or equivalents shall also be construed as falling into the claimed scope of the invention.

The invention claimed is:

1. A spectrum resource managing apparatus, used in a wireless communication system, comprising:
   a memory
   a circuitry configured to
   acquire resource utilization information of at least one managed access network, the resource utilization information comprising an antenna parameter of the at least one managed access network, and
   determine spectrum resource allocation to the at least one managed access network based on the resource utilization information^
   wherein the antenna parameter of the at least one managed access network comprises a parameter selected from the group consisting of antenna location, antenna number, antenna dimension, antenna angle, antenna array, and combinations thereof.

2. The spectrum resource managing apparatus of claim 1, wherein the circuitry is further configured to send a result of the spectrum resource allocation to the at least one managed access network.

3. The spectrum resource managing apparatus of claim 1, wherein the at least one managed access network comprises a plurality of access networks.

4. The spectrum resource managing apparatus of claim 1, wherein the resource utilization information further comprises at least one of location of at least one managed access network and distance between managed access networks.

5. The spectrum resource managing apparatus of claim 1, wherein the antenna parameter comprises antenna capability information.

6. The spectrum resource managing apparatus of claim 5, wherein the antenna capability information comprises access network scheduling information and the access network scheduling information indicates the at least one managed network joining or not joining antenna scheduling.

7. The spectrum resource managing apparatus of claim 1, wherein the antenna parameter comprises antenna type.

8. The spectrum resource managing apparatus of claim 1, wherein a result of the spectrum resource allocation comprises antenna beam information.

9. The spectrum resource managing apparatus of claim 8, wherein the antenna beam information comprises information selected from the group consisting of:
   radiation angle of an antenna beam,
   deflection angle of the radiation angle of the antenna beam relative to a reference direction,
   radiation radius of the antenna beam, and
   combinations thereof.

10. The spectrum resource managing apparatus of claim 9, wherein the radiation radius of the antenna beam is an average distance from a location of the antenna to a location with signal field strength attenuated below a predetermined threshold.

11. The spectrum resource managing apparatus of claim 1, wherein the circuitry is configured to determine the spectrum resource allocation to the at least one managed access network such that an interference between wireless links of antenna scheduling is within a predetermined range.

12. A spectrum resource managing method, used in a wireless communication system, comprising:
   acquiring resource utilization information of at least one managed access network, the resource utilization information comprising an antenna parameter of the at least one managed access network; and
   determining spectrum resource allocation to the at least one managed access network based on the resource utilization information,
   wherein the antenna parameter of the at least one managed access network comprises a parameter selected from the group consisting of antenna location, antenna number, antenna dimension, antenna angle, antenna array, and combinations thereof.

13. A non-transitory computer program product on which computer readable instruction codes are stored, the instruction codes upon being read and executed by a computer causing the computer to perform a spectrum resource managing process, the spectrum resource managing process comprising:
   acquiring resource utilization information of at least one managed access network, the resource utilization information comprising an antenna parameter of the at least one managed access network; and
   determining spectrum resource allocation to the at least one managed access network based on the resource utilization information,
   wherein the antenna parameter of the at least one managed access network comprises a parameter selected from the group consisting of antenna location, antenna number, antenna dimension, antenna angle, antenna array, and combinations thereof.

* * * * *